United States Patent Office 3,494,757
Patented Feb. 10, 1970

3,494,757
NITRIFICATION INHIBITOR COMPRISING SUBSTITUTED PYRAZOLES
David W. Osborne, Midland, Mich., assignor to The Dow Chemical Company, Midland, Mich., a corporation of Delaware
No Drawing. Continuation-in-part of application Ser. No. 592,281, Nov. 7, 1966. This application June 20, 1968, Ser. No. 738,424
Int. Cl. A01c 21/00; A01n 7/00
U.S. Cl. 71—1   13 Claims

ABSTRACT OF THE DISCLOSURE

1-[alkylcarbonyl, N,N-dialkylcarbamoyl, N,N-diakylthiocarbamoyl and alkyl thiocarbonyl] substituted pyrazole compounds are employed as the active ingredients in a method useful for inhibiting the nitrification of ammonium nitrogen in plant growth media such as soil. Useful compositions employing such compounds are also disclosed. Typical compositions comprise a reduced nitrogen fertilizer and a substituted pyrazole.

CROSS-REFERENCE TO RELATED APPLICATION

This application is a continuation-in-part of my copending application, Ser. No. 592,281, filed Nov. 7, 1966, now abandoned.

BACKGROUND OF THE INVENTION

Description of the prior art

The substituted pyrazoles employed as the active ingredients in the composition and method of the invention can be prepared by known procedures and methods analogous thereto. Various useful methods are disclosed by Huckel et al., Berichte, 70B, 2024 (1937); Twomey, J. Org. Chem., 31, 2494-2497 (1966) and U.S. Patents Nos. 3,282,978, 3,150,148 and 3,308,130.

SUMMARY OF THE INVENTION

The present invention relates to crop culture and is particularly concerned with a practice for conserving soil nitrogen and for supplying the soil nitrogen requirements for plant nutrition. The nature of the agricultural problem for which the present invention constitutes a remedy has previously been discussed in the art: see, for example, the introduction to U.S. Patent 3,135,594.

The method of the present invention comprises impregnating a plant growth medium with a substituted pyrazole compound corresponding to the formula:

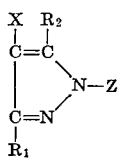

In the present specification and claims, $R_1$ and $R_2$ each independently represent hydrogen or methyl, X represents hydrogen or a halogen which can be chloro or bromo and Z represents loweralkylcarbonyl (COOR), N,N-di(loweralkyl)-carbamoyl ($CONR_2$), loweralkyl thiolcarbonyl (COSR) or N,N-di(loweralkyl)-thiocarbamoyl ($CSNR_2$), wherein R and loweralkyl represent loweralkyl groups containing from 1, to 2, to 3, to 4 carbon atoms with the proviso that when Z is N,N-di(loweralkyl)-thiocarbamoyl or N,N-di(loweralkyl)-carbamoyl, both $R_1$ and $R_2$ are hydrogen. When Z represents N,N-di(loweralkyl)-thiocarbamoyl ($CSNR_2$) or N,N-di(loweralkyl)-carbamoyl ($CONR_2$), the loweralkyl or R substituents can be the same, as in N,N-dimethylcarbamoyl, or different, as in N-ethyl-N-butylthiocarbamoyl. The compounds wherein the loweralkyl groups are identical, e.g., those wherein Z is symmetrical N,N-di(loweralkyl)-carbamoyl or N,N-di(loweralkyl)-thiocarbamoyl, are preferred. In the present specification and claims, the term "substituted pyrazole" is used to refer to such compounds.

The substituted pyrazoles are crystalline solids or colorless liquids which are soluble in a variety of organic solvents such as benzene and acetone and less soluble in water. The compounds wherein Z is N,N-di(loweralkyl)-carbamoyl, loweralkyl thiolcarbonyl or N,N-di(loweralkyl)-thiocarbamoyl are stable over a wide range of temperatures and are stable to hydrolysis.

It has been discovered that by distributing a nitrification-inhibiting amount of a substituted pyrazole in a plant growth medium, the nitrification of ammonium nitrogen in the medium to nitrate nitrogen is suppressed, thereby preventing the rapid loss of ammonium nitrogen from the medium. Furthermore, by proper distribution of the substituted compound, this action of inhibiting the transformation of ammonium nitrogen to nitrate nitrogen is effective over a prolonged period of time. The ammonium nitrogen in the medium may arise from the addition of a reduced nitrogen fertilizer to the medium or be formed in the plant growth medium by conversion of the organic nitrogen constituents found in plant growth media. The term "plant growth media" is herein employed to refer to various natural and artificial media which support plant growth, including soil, potting mixtures of organic and inorganic matter and artificial media such as polyurethane foams.

The expression "reduced nitrogen fertilizers" is employed in the present specification and claims as understood in the art, as embracing both inorganic and organic nitrogenous materials containing nitrogen in the reduced state. Examples of known reduced nitrogen fertilizers include anhydrous and aqueous ammonia, inorganic ammonium salt such as ammonium phosphate, ammonium nitrate and ammonium sulfate, ammonium salts of organic acids, urea, cyanamide, guanidine nitrate, dicyandiamide, amino acids, guanyl urea sulfate, thiourea, uramon, amines, ureaform and other nitrogen-containing organic chemical fertilizers as well as protein mixtures, animal tankages, green manure, fish products, crop residues and other natural materials known to be sources of ammonium ions in plant growth media, particularly in soil. These fertilizer materials contain nitrogenous compounds in which the apparent valency or oxidation state of the nitrogen is from −3 to −1, inclusive. Furthermore, inasmuch as the following equilibrium exists in the presence of water even when the latter is present in minor proportions $$NH_3 + H_2O \rightleftharpoons NH_4OH \rightleftharpoons NH_4^+ + OH^-$$

it is to be understood that when reference is made herein to either ammonium ion or ammonia in soil, it is meant to embrace the other component, namely, ammonia or ammonium ion, respectively.

The provision of an effective nitrification inhibiting amount of one or more substituted pyrazole in the soil or plant growth medium is essential for the practice of the present invention. In general, good results are obtained when the growth medium is impregnated with a substituted pyrazole compound in an amount of from about 1 part to about 4000 parts or more by weight per million parts by weight of growth medium. (Hereinafter, the abbreviation p.p.m., when employed, is meant to designate parts by weight of substituted pyrazole per million parts by weight of soil or growth medium.) The preferred amounts to be employed are dependent upon the particular situation. Thus, in determining the amount to be employed, consideration is made not only of the treatment need, i.e., soil pH, temperature, soil type, etc., but also of the mode of application to soil. When the substituted pyrazole is to be applied in a broadcast application, the amount in p.p.m. may frequently be less than in row or band application where, for a substantial depth and width within the vicinity of application, there can be a very high concentration of the substituted pyrazole. When application is made near the root zone or growing plants or when application is made immediately prior to seeding or transplanting, the amounts supplied are frequently at a lower rate than when application is made at the end of the growing season to prepare the soil for the following season. By dispersing very large dosages in growth media, a prolonged inhibition of nitrification can be obtained over a period of many months. The concentration of the active substituted pyrazole is eventually reduced to a minimum by decomposition in the soil.

In one method for carrying out the present invention, the substituted pyrazole is distributed throughout the growth media in a broadcast application such as by spraying, dusting, distributing in irrigation water, etc. In such application, the substituted pyrazole is supplied in amounts sufficient to permeate the growing area of soil with an amount of from about 1 to about 2000 p.p.m., and preferably, from about 2 to about 250 p.p.m. In field administration, the substituted pyrazole can be distributed in the soil in the amount of at least 0.4 pound per acre and through such cross-section of the soil as to provide for the presence therein of an effective concentration of the agent. It is usually preferred that the substituted pyrazole be distributed to a depth of at least two inches below the soil surface and at a dosage of at least 0.5 pound per acre inch of soil.

In another method for carrying out the present invention, the substituted pyrazole is administered to growth medium in a band or row application. In such application, administration is made with or without carrier in amounts sufficient to supply to soil or growth medium a concentration of the substituted pyrazole which can be as high as 4000 r.p.m. or more. After administration with or without discing or dragging, subsequent irrigation or rainfall distributes the substituted pyrazole throughout the growth medium.

In one embodiment of the present invention, the substituted pyrazole is distributed throughout the growth media prior to seeding or transplanting the desired crop plant.

In another embodiment, the soil is the root zone of growing plants is treated with the substituted pyrazole in an amount effective to inhibit nitrification but sublethal to plant growth. In such operations, the compounds should be supplied in the soil in amounts which have preferred upper limits at about 35 p.p.m. The compounds wherein $R_1$, $R_2$ and $X$ are all hydrogen have little or no phytotoxicity and have high potency and can be employed advantageously at dosages of from 25, to 50, to 125 p.p.m. Such compounds are preferred for use in this embodiment of the invention. By following such practice, no adverse effect is exerted by the substituted pyrazole upon growth of seeds or plants. Oftentimes, it is desirable to treat the soil adjacent to plants, and this procedure may be carried out conveniently in side-dressing operations.

In a further embodiment, soil can be treated with the products following harvest or after following to prevent rapid loss of ammonium nitrogen and to enhance the build-up of ammonium nitrogen formed by microbial conversion of organic nitrogen compounds. Such practice conserves the soil nitrogen for the following growing season. In such application, the upper limit is primarily an economic consideration.

In an additional embodiment, the soil is treated with the substituted pyrazole in conjunction with the application of reduced nitrogen fertilizers. The treatment with the substituted pyrazole can be carried out prior to, subsequent to or simultaneously with the application of fertilizers. Such practice prevents the rapid loss of the ammonium nitrogen added as fertilizer and the ammonium nitrogen formed from the organic reduced nitrogen in fertilizers by the action of soil bacteria. The administration to the soil of a substituted pyrazole compound in an ammonium nitrogen fertilizer composition constitutes a preferred embodiment of the present invention.

The present invention can be carried out by distributing the substituted pyrazole in an unmodified form through growth medium. The present method also embraces distributing one or more such compounds as a constituent in liquid or finely divided solid compositions. In such practice, the substituted pyrazole can be modified with one or more additaments or soil treating adjuvants including water, petroleum distillates or other liquid carriers, surface-active dispersing agents, inert finely divided solids and fertilizers such as reduced nitrogen fertilizers. Preferred adjuvants are surface-active dispersing agents, inert finely divided solids, and especially, reduced nitrogen fertilizers; these adjuvants cooperate with the substituted pyrazole so as to facilitate the practice of the present invention and to obtain an improved result. Depending upon the concentration of the substituted pyrazole compound, augmented compositions can be distributed in the soil without further modification or can be considered as concentrates and subsequently diluted with additional inert carrier to produce the ultimate treating composition. The required amount of the substituted pyrazole can be supplied to growth media in from 1 to 50 gallons of organic solvent carrier, in from 5 to 27,000 or more gallons of aqueous carrier or in from about 20 to 2000 pounds of solid carrier per acre treated. When an organic solvent carrier is employed, it can be further dispersed in the above volume of aqueous liquid carrier.

The concentration of substituted pyrazole in compositions to be employed for the treatment of growth media is not critical and can vary considerably provided the required dosage of effective agent is supplied to the growth media. In general, good results are obtained with liquid compositions containing from about 0.00001 to about 0.25 percent by weight of the substituted pyrazole; in some operations, however, compositions containing amounts of substituted pyrazole in excess of 0.25 percent, such as from 2 to 98 percent of substituted pyrazole by weight of composition, are conveniently employed as, for example, in row or band application. With dusts, good results are usually obtained with compositions containing from 0.0001 to 10 percent or more by weight of substituted pyrazole compound. In some circumstances, such as in high intensity application, however, it is preferred to employ dust compositions containing as much as from 2 to 98 percent or more by weight of substituted pyrazole. Liquid or dust compositions in which the substituted pyrazole compound is present in higher concentration can be utilized as such or can be employed as concentrate compositions to be diluted to prepare actual treating compositions.

Liquid compositions containing the desired amount of the substituted pyrazole compound can be prepared by dispersing the latter in one or more liquid carriers such as water or an organic solvent with or without the aid of a suitable surface active dispersing agent or emulsifying agent. Suitable organic solvents include acetone, diisobutylketone, methanol, ethanol, isopropyl alcohol, diethyl ether, toluene, methylene chloride, chlorobenzene and the petroleum distillates. The preferred organic solvents are those which are of such volatility that they leave little permanent residue in the growth media. Dispersing and emulsifying agents which can be employed in liquid compositions include condensation products of alkylene oxides with phenols and organic acids, alkyl aryl sulfonates, polyoxy-alkylene derivatives of sorbitol esters, sugar esters, complex ether alcohols, mahogany soaps and the like. The surface active agents are generally employed in the amount of from 1 to 20 percent by weight of the substituted pyrazole.

Solid compositions containing the active substituted pyrazole compound can be prepared by dispersing the latter in finely divided inert solid carriers such as talc, chalk, gypsum, vermiculite, bentonite and the like, fuller's earth, attapulgite and other clays, various solid detergent dispersing agents and solid fertilizer compositions. In preparing such compositions, the carrier is mechanically ground with a solid substituted pyrazole or wet with a liquid substituted pyrazole or a solution or dispersion of a solid or liquid substituted pyrazole in a volatile organic solvent. Depending upon the proportions of ingredients, these compositions can be employed without further modification or be considered concentrates and subsequently further diluted with solid surface active dispersing agent, talc, chalk, gypsum or the like to obtain the desired treating composition. Furthermore, such concentrate compositions can be dispersed in water with or without added dispersing agent or agents to prepare aqueous soil treating compositions.

Soil treating compositions can be prepared by dispersing one or more substituted pyrazole compound in a reduced nitrogen fertilizer such as an ammonium fertilizer or an organic nitrogen fertilizer. The concentration of substituted pyrazole compound employed in such compositions should, in general, be sufficient to substantially inhibit the conversion of the reduced nitrogen in the fertilizer to nitrate nitrogen when the fertilizer is distributed in a plant growth medium. The resulting fertilizer composition can be employed as such or can be modified as by dilution with additional nitrogen fertilizer or with inert solid carrier to obtain a composition containing the desired amount of active agent for treatment of soil. Further, an aqueous dispersion of the substituted pyrazole compound-reduced nitrogen fertilizer composition can be prepared and administered to the growth medium. Reduced nitrogen fertilizer compositions comprising a nitrification-inhibiting amount of a substituted pyrazole in intimate admixture with the reduced nitrogen fertilizer constitute preferred embodiments of the present invention.

It is desirable that the substituted pyrazole be present in an amount of at least about 0.05 percent by weight based on the weight of the nitrogen present in the reduced nitrogen fertilizer as reduced nitrogen and it can be present in amounts as high as 95 percent by weight of the reduced nitrogen in the fertilizer. Generally, amounts of substituted pyrazole in excess of about 25 percent yield no greater advantage and are therefore seldom used. Thus, when a fertilizer composition contains both reduced nitrogen and other forms of nitrogen, such as in the case of ammonium nitrate fertilizer compositions, the amount of substituted pyrazole is based on the weight of nitrogen present in the ammonium component.

The substituted pyrazoles of the method and composition of the invention are prepared by the reaction of a pyrazole with a substituted acyl chloride of the formula Z—Cl wherein Z has the significance described above. Representative pyrazoles which can be employed as starting materials include pyrazole, 4-chloropyrazole, 4-bromopyrazole, 3,5 - dimethylpyrazole, 4 - bromo - 3 - methylpyrazole and 4-chloro-3,5-dimethylpyrazole. Representative acyl chlorides which may be employed as starting materials include methyl chloroformate, ethyl chloroformate, propyl chloroformate, isopropyl chloroformate, butyl chloroformate, methyl chlorothiolformate, ethyl chlorothiolformate, propyl chlorothiolformate, butyl chlorothiolformate, dimethylcarbamoyl chloride, N-methyl - N - ethylcarbamoyl chloride, diethylcarbamoyl chloride, N-propyl - N - butylcarbamoyl chloride, diisopropylcarbamoyl chloride, dibutylcarbamoyl chloride, dimethylthiocarbamoyl chloride, N-methyl-N-ethylthiocarbamoyl chloride, diethylthiocarbamoyl chloride, N-methyl - N - butylthiocarbamoyl chloride, dipropylthiocarbamoyl chloride and dibutylthiocarbamoyl chloride.

The reaction proceeds when the reactants are contacted and mixed in the presence of a hydrogen chloride acceptor such as pyridine, lutidine or the like, or a tertiary alkylamine such as trimethylamine or triethylamine. The reaction is preferably carried out in the presence of an inert organic solvent as a reaction medium. Representative and suitable organic solvents which can be employed as reaction media include benzene and chlorinated solvents such as chloroform and carbon tetrachloride. The reaction proceeds readily at temperatures of from −20° to 100° C. When Z is loweralkyl thiolformate, or loweralkyl formate, the reaction is preferably carried out at temperatures from −20° to 50° C. and in all other cases, the reaction is preferably carried out at the boiling temperature of the reaction mixture and under reflux. The exact proportions of the reactants are not critical, some of the desired product being obtained when the reactants are employed in any proportions. However, in going to completion, the reaction consumes the reactants and the hydrogen chloride acceptor in equimolar proportions and the use of the reactants and the hydrogen chloride acceptor in such proportions is preferred. During the reaction, the hydrochloride salt of the hydrogen chloride acceptor forms and may precipitate from the mixture. This salt can be removed by such conventional procedures as extraction, filtration or centrifugation. The 1-substituted pyrazole product can be separated by such conventional procedures as evaporation and purified by conventional procedures such as distillation and extraction.

In preparing the 1-substituted pyrazoles of the method and composition of the invention, pyrazole, as described above, a substituted acyl chloride, as described above, and a hydrogen chloride acceptor, preferably triethylamine, are contacted and mixed in the presence of an inert organic solvent. In a convenient procedure, the acyl chloride is added slowly to a cooled mixture of the substituted pyrazole, hydrogen chloride acceptor and reaction medium. Heat is evolved during the addition of the substituted acyl chloride and when the acyl chloride is a loweralkyl chlorothiolformate or loweralkyl chloroformate, the reaction mixture warms spontaneously. When the substituted acyl chloride is a loweralkylcarbamoyl chloride or a loweralkylthiocarbamoyl chloride, the mixture is preferably heated to the boiling temperature under reflux. The mixture is held within the desired reaction temperature range for a period of time, conveniently from about 2 to 8 hours before cooling. Good yields are obtained with reaction times of about 4 to 5 hours. The hydrochloride salt of the hydrogen chloride acceptor is removed by conventional procedures such as filtration or extraction with water. In the preferred procedure, the reaction mixture is extracted with water to remove the salt byproduct and unreacted pyrazole. The product is separated by such conventional procedures as evaporation and distillation. The product separated as described above may be employed in the control of nitrification of soil or may be further purified by conventional procedures such as extraction and distillation.

DESCRIPTION OF THE PREFERRED EMBODIMENTS

The following examples illustrate the invention but are not to be construed as limiting the same.

EXAMPLE 1

Pyrazole (13.6 grams; 0.200 mole) and triethylamine (20.2 grams; 0.20 mole) are mixed together with 200 milliliters of chloroform and the resulting mixture is cooled to a temperature of about 2°–10° C. Methyl chlorothiolformate (25.3 grams; 0.23 mole) is added dropwise to the cold mixture over a 25-minute period. The mixture warms spontaneously and is stirred for about four hours. The mixture is then extracted with water, the water being discarded, and the extracted mixture is evaporated under reduced pressure to obtain a pale yellow oil as a residue. The residue is distilled in vacuo and the product is collected as a fraction boiling at 50°–52° C. under a pressure of 0.6 millimeter of mercury. The methyl pyrazole-1-thiolcarboxylate product is a colorless liquid which is found to have a refractive index $n_D^{25}$ of 1.5586, and is found by analysis to have carbon and nitrogen contents of 42.0 and 19.5 percent, respectively, as compared with the theoretical contents of 42.3 and 19.7 percent, respectively, calculated for said substituted pyrazole.

In substantially the same procedure and employing a similar inert organic solvent as a reaction medium, the following substituted pyrazoles are prepared:

Ethyl pyrazole-1-thiolcarboxylate, having a molecular weight of 156.2, is prepared by mixing together equimolar proportions of ethyl chlorothiolformate, pyrazole and a hydrogen chloride acceptor.

Isopropyl pyrazole-1-thiolcarboxylate, having a molecular weight of 170.2, is prepared by mixing together equimolar proportions of isopropyl chlorothiolformate, pyrazole and a hydrogen chloride acceptor.

Normal-butyl pyrazole-1-thiolcarboxylate, having a molecular weight of 184.3, is prepared by mixing together equimolar proportions of n-butyl chlorothiolformate, pyrazole and a hydrogen chloride acceptor.

Ethyl pyrazole-1-carboxylate, boiling at 26°–27° C. under a pressure of 0.03 millimeter of mercury and having a refractive index $n_D^{25}$ of 1.4788, is prepared by mixing together equimolar proportions of ethyl chloroformate, pyrazole and a hydrogen chloride acceptor.

Propyl 4-chloro-3-methyl-pyrazole-1-thiol carboxylate, having a molecular weight of 219, is prepared by mixing together equimolar proportions of propyl chlorothiolformate, 4-chloro-3-methylpyrazole and a hydrogen chloride acceptor.

Methyl 4-bromo-3,5-dimethylpyrazole - 1-carboxylate, having a molecular weight of 233, is prepared by mixing together equimolar proportions of methyl chloroformate, 4-bromo-3,5-dimethylpyrazole and a hydrogen chloride acceptor.

Ethyl 3,5-dimethylpyrazole-1-carboxylate, boiling at about 68° C. under a pressure of 0.8 millimeter of mercury and having a refractive index $n_D^{25}$ of 1.4835, is prepared by mixing together equimolar proportions of ethyl chloroformate, 3,5-dimethylpyrazole and a hydrogen chloride acceptor.

Methyl pyrazole-1-carboxylate, melting at 36°–37° C., is prepared by mixing together equimolar proportions of methyl chloroformate, pyrazole and a hydrogen chloride acceptor.

Normal-butyl 3-methylpyrazole-1-carboxylate, having a molecular weight of 182, is prepared by mixing together equimolar proportions of n-butyl chloroformate, 3-methylpyrazole and a hydrogen chloride acceptor.

EXAMPLE 2

Dimethylcarbamoyl chloride (21.5 grams; 0.20 mole), pyrazole (13.6 grams; 0.20 mole) and triethylamine (20.2 grams; 0.20 mole) are mixed together with 200 milliliters of benzene and the resulting mixture is heated at the boiling point under reflux for five hours. During the mixing and heating, a precipitate forms. The reaction mixture is cooled and the precipitate is removed by filtration. The filtrate is evaporated in vacuo to leave an oily residue. The residue is distilled in vacuo and a fraction boiling at 64°–71° C. under a pressure of 2.5 millimeters of mercury is collected. This fraction is dissolved in carbon tetrachloride, the resulting solution is extracted with water and the water discarded and the remaining solution is distilled in vacuo. The N,N-dimethylpyrazole-1-carboxamide product is collected as a fraction boiling at 71.5°–72.5° C. under a pressure of 2.3 millimeters of mercury and the product is found to have a refractive index $n_D^{25}$ of 1.509.

The product is found by analysis to have carbon, hydrogen and nitrogen contents of 51.4, 6.69 and 30.2 percent, respectively, as compared with the theoretical contents of 51.8, 6.52 and 30.2 percent, respectively, calculated for the named structure.

In substantially the same procedure and employing a similar inert organic solvent as a reaction medium, the following substituted pyrazoles are prepared:

N,N-diethylpyrazole-1-carboxamide, having a molecular weight of 167.2, is prepared by mixing together equimolar proportions of diethylcarbamoyl chloride, pyrazole and a hydrogen chloride acceptor.

N,N-dipropylpyrazole-1-carboxamide, having a molecular weight of 195.25, is prepared by mixing together dipropylcarbamoyl chloride, pyrazole and a hydrogen chloride acceptor.

N,N-diisobutylpyrazole-1-carboxamide, having a molecular weight of 223.3, is prepared by mixing together equimolar proportions of pyrazole, diisobutylcarbamoyl chloride and a hydrogen chloride acceptor.

N,N-dimethyl-4-chloropyrazole-1-carboxamide, melting at 50°–51.5° C., is prepared by mixing together dimethylcarbamoyl chloride, 4-chloropyrazole and a hydrogen chloride acceptor.

N-ethyl-N-methylpyrazole - 1 - carboxamide, having a molecular weight of 153.2, is prepared by mixing together equimolar proportions of N-ethyl-N-methylcarbamoyl chloride, pyrazole and a hydrogen chloride acceptor.

N-ethyl-N-butylpyrazole - 1 - carboxamide, having a molecular weight of 195.25, is prepared by mixing together N-ethyl-N-butylcarbamoyl chloride, pyrazole and a hydrogen chloride acceptor.

EXAMPLE 3

Dimethylthiocarbamoyl chloride (14.81 grams; 0.12 mole), pyrazole (8.16 grams; 0.12 mole) and triethylamine (12.12 grams; 0.12 mole) are mixed together with 150 milliliters of chloroform and the resulting mixture is heated to the boiling point under reflux for five hours. The mixture is cooled, extracted with two 200-milliliter portions of water, the water being discarded, and evaporated under reduced pressure to leave a residual oil. The oil is distilled in vacuo and the product is collected as a fraction boiling at 96°–98° C. under a pressure of 1.3 millimeters of mercury. The N,N-dimethylthiopyrazole-1-carboxamide product is obtained as a colorless liquid which is found to have a refractive index $n_D^{25}$ of 1.6038. The product is found by analysis to have carbon, hydrogen and nitrogen contents of 46.2, 5.82 and 27.2 percent, respectively, as compared with the theoretical contents of 46.4, 5.84 and 27.1 percent, respectively, calculated for the named structure.

In substantially the same procedure and employing a similar inert organic solvent as a reaction medium, the following substituted pyrazoles are prepared:

N,N-diethylthiopyrazole-1-carboxamide, having a molecular weight of 183.3, is prepared by mixing together equimolar proportions of diethylthiocarbamoyl chloride, pyrazole and a hydrogen chloride acceptor.

N,N-diisopropylthiopyrazole-1-carboxamide, having a molecular weight of 211.3, is prepared by mixing together equimolar proportions of diisopropylthiocarbamoyl chloride, pyrazole and a hydrogen chloride acceptor.

N,N-dibutylthiopyrazole-1-carboxamide, having a molecular weight of 239.4, is prepared by mixing together equimolar proportions of dibutylthiocarbamoyl chloride, pyrazole and a hydrogen chloride acceptor.

N-propyl-N-methylthiopyrazole-1-carboxamide, having a molecular weight of 183.3, is prepared by mixing together equimolar proportions of N-propyl-N - methylthiocarbamoyl chloride, pyrazole and a hydrogen chloride acceptor.

N,N-diethylthio-4-chloropyrazole-1-carboxamide, having a molecular weight of 219, is prepared by mixing together equimolar proportions of diethylthiocarbamoyl chloride, 4-chloropyrazole and a hydrogen chloride acceptor.

EXAMPLE 4

In a representative operation, aqueous compositions each containing one of methyl pyrazole-1-thiol-carboxylate, N,N-dimethyl-pyrazole - 1 - carboxyamide, N,N-dimethylthio-pyrazole-1-carboxamide or ethyl pyrazole-1-carboxylate and an ammonium fertilizer are prepared by by separately dissolving one of the pyrazole compounds in acetone and diluting the acetone solution with an aqueous solution of ammonium sulfate. The compositions thus prepared contain about 2.5 percent of a substituted pyrazole compound based on the nitrogen content of the fertilizer.

The compositions so prepared are employed to treat seed beds of sandy loam soil having a pH of about 8 containing essentially no organic material and having been freed of nitrite and nitrate nitrogen by prior thorough leaching. In the treating operation, the seed beds are air dried and the compositions are applied to the dried seed beds as a soil drench in an amount sufficient to provide one of the substituted pyrazole compounds at a concentration of 5.0 parts of substituted pyrazole per million by weight of soil together with a known amount of ammonium sulfate sufficient to provide approximately 200 parts per million of nitrogen. A similar seed bed is similarly treated with an aqueous composition containing the same amount of ammonium sulfate and no pyrazole compound to serve as a check. The seed beds are sealed and incubated for two weeks at a temperature of 25° C. At the end of the test period, the soil in the seed beds is analyzed for combined nitrate plus nitrate nitrogen. The determinations are carried out by extracting the nitrate and nitrite from the soil with a saturated calcium sulfate solution, developing color in the clear supernatant of the extract with diphenylamine in sulfuric acid and comparing the color with a standard solution containing known concentrations of nitrate and nitrite ions. The check soil is found to have undergone substantially complete nitrification, substantially all the nitrogen added as ammonium sulfate being recovered as nitrate and nitrite nitrogen.

The soil in the seed bed treated with methyl pyrazole-1-thiolcarboxylate is found to contain 1/10 as much nitrate and nitrite nitrogen as the check seed bed treated only with ammonium sulfate. The soil in the seed bed treated only with ammonium sulfate. The soil in the seed bed treated with N,N-dimethyl-pyrazole-1-carboxamide is found to contain 1/10 as much nitrate and nitrite nitrogen as the soil in the check seed bed. The soil in the separate seed beds treated with N,N-dimethylthio-pyrazole-1-carboxamide and ethyl pyrazole-1-carboxylate is found to contain 1/5 as much nitrate and nitrite as the soil in the check seed bed.

The analytical method employed in the above operations is similar to that disclosed in "Colorimetric Methods of Analysis," by Snell and Snell, D. Van Nostrand Co., Inc., vol. II, 3rd edition, page 801.

EXAMPLE 5

In similar operations, aqueous reduced nitrogen fertilizers containing 10 parts by weight of substituted pyrazole compound and 1000 parts by weight of nitrogen are prepared by dissolving one of methyl pyrazole-1-carboxylate or N,N-dimethylthio-pyrazole-1-carboxamide in acetone and dispersing the resulting solution in aqueous ammonium sulfate.

Seed beds of alkaline sandy loam soil containing negligible amounts of ammonium nitrogen are then treated separately with the ammonium sulfate fertilizer compositions in an amount sufficient to provide two parts by weight of the substituted pyrazole per million parts by weight of the soil. The seed beds are sealed and incubated for four weeks at 70° F. The air over the seed beds is changed weekly. A similar seed bed is similarly treated with aqueous ammonium sulfate alone to serve as a check. Both the test seed beds and the check beds initially contain about 200 parts by weight of ammonium nitrogen per million parts by weight of soil.

At the end of the test period, the ammonium nitrogen content of the soil in each seed bed is determined by a conventional procedure involving distillation of ammonia from the soil in the presence of a base and titration of the distilled ammonia. The soil in the check seed bed is found to have undergone substantially complete nitrification and no detactable ammonia is recovered therefrom. In contrast, the soil in the seed beds treated with one of methyl pyrazole-1-carboxylate or N,N-dimethylthio-pyrazole-1-carboxyamide is observed to have undergone only 27 and 1 percent nitrification, respectively, 73 percent and 99 percent, respectively, of the nitrogen added as ammonium sulfate being recovered as ammonia.

EXAMPLE 6

Reduced nitrogen fertilizers are prepared in a procedure similar to that employed above in Examples 4 and 5. In these operations, one of ethyl 3,5-dimethylpyrazole-1 - carboxylate or N,N-dimethyl-4-chloropyrazole-1-carboxamide is dissolved in acetone and mixed with aqueous urea to provide a composition containing about 4.2 parts of substituted pyrazole per million parts of solution. The compositions contain about 2 percent of pyrazole based on the reduced nitrogen content.

The compositions are separately distributed in seed beds of alkaline sandy loam soil of negligible nitrate and nitrite content to provide 10 parts by weight of substituted pyrazole compound per million parts by weight of soil. Soil in a similar seed bed is mixed with an equal amount of urea fertilizer containing no substituted pyrazole compound to serve as a check. The seed beds are held for two weeks at ambient temperatures. Analyses for nitrate and nitrite nitrogen by the method of Example 4 show that the check soil has undergone substantially complete nitrification, essentially all the added urea nitrogen being obtained as nitrate and nitrite nitrogen. In contrast, both seed beds treated with a substituted pyrazole compound are found to have 15 percent as much nitrate and nitrite nitrogen as the similar check bed indicating 85 percent protection from nitrification.

EXAMPLE 7

Following a procedure similar to that of Example 5, aqueous reduced nitrogen fertilizers containing ammonium sulfate and one of methyl pyrazole-1-thiol-carboxylate, butyl pyrazole-1-carboxylate, N-methyl-N-ethylthio-pyrazole-1-carboxamide, N,N-diethyl-4-bromo-pyrazole-1-carboxamide and isopropyl 3-methylpyrazole 1-carboxylate are prepared. Such compositions are prepared to contain various concentrations from 10 to 25 percent of a substituted pyrazole based on ammonium nitrogen concentration. The compositions are distributed in soil at rates varying from 25 to 100 parts of substituted pyrazole per million parts of soil. Recovery of ammonium nitrogen after four weeks' incubation is excellent in all cases. Soil treated with check fertilizers containing no substituted pyrazole compound is found to undergo substantially complete nitrification.

EXAMPLE 8

Reduced nitrogen fertilizer compositions are prepared by mixing one of N,N-dimethylthio-pyrazole-1-carboxamide, ethyl pyrazole-1-carboxylate and N,N-dimethyl-pyrazole-1-carboxamide with oven-dried manure. The substituted pyrazole compounds are employed in an amount sufficient to provide 5 parts of substituted pyrazole per 100 parts of reduced nitrogen in the ultimate composition. The compositions are mixed with a plant growth medium comprising vermiculite and peat moss to distribute a substituted pyrazole throughout the medium at a concentration of 50 parts per million. The plant growth media are lightly watered and held for two weeks. Analysis of nitrate and nitrite nitrogen at the end of the test period indicates that excellent inhibition of nitrification is obtained in the plant growth media containing one of N,N-dimethylthio-pyrazole-1-carboxamide, ethyl pyrazole-1-carboxylate or N,N-dimethyl-pyrazole-1-carboxamide as compared with the substantially complete nitrification observed with check compositions containing no substituted pyrazole.

EXAMPLE 9

Concentrate compositions are prepared as follows:

(A) 25 parts by weight of N,N-dipropylthio-4-chloropyrazole-1-carboxamide, 65 parts by weight of xylene and 10 parts by weight of an alkylated aryl polyether alcohol (Triton X–100) are mechanically mixed together to obtain an emulsifiable liquid composition.

(B) 40 parts by weight of N,N-diethyl-4-bromo-pyrazole-1-carboxamide, 50 parts by weight of N-ethyl-N-methyl-pyrazole-1-carboxamide and 10 parts of an alkyl aryl sulfonate (Acto 700) are mechanically mixed together to obtain a water-dispersible mixture.

These compositions can be dispersed in water to produce aqueous compositions having desirable wetting and penetrating properties. These aqueous compositions are then employed to treat soil in an amount sufficient to distribute the substituted pyrazole compound therein in effective nitrification-inhibiting concentrations. The concentrates can also be dispersed in aqueous ammonia to prepare reduced nitrogen fertilizer compositions.

EXAMPLE 10

Fertilizer compositions are prepared as follows:

(A) N,N - dimethylthio-pyrazole-1-carboxamide is mechanically mixed with diammonium phosphate to prepare reduced nitrogen fertilizer compositions containing 5 percent by weight of N,N-dimethylthio-pyrazole-1-carboxamide.

(B) Ethyl 3,5-dimethylpyrazole - 1 - carboxylate is mechanically mixed with ammonium nitrate to prepare a reduced nitrogen fertilizer composition containing 3 percent by weight of ethyl 3,5-dimethylpyrazole-1-carboxylate.

(C) Methyl pyrazole-1-carboxylate, N,N-dimethyl-4-chloropyrazole-1-carboxamide and isopropyl 4-chloro-5-methylpyrazole-1-thiocarboxylate are mixed together. The mixture is mechanically mixed with urea to prepare reduced nitrogen fertilizer compositions containing 4 percent by weight of the mixture of substituted pyrazole compounds.

These fertilizer compositions are distributed in soil to supply the nitrogen requirements for plant nutrition. The treated soil is resistant to nitrification and provides nitrogen available for plant growth over a prolonged period of time.

EXAMPLE 11

A solid fertilizer composition is prepared as follows: (1) an inhibitor component is prepared by (a) mixing together 0.5 gram of N,N-dimethylthio-pyrazole-1-carboxamide and 0.15 gram of attapulgite clay, (b) adding 0.75 gram of pyrophyllite thereto and grinding the resulting mixture until a finely powdered uniform composition is obtained; (2) a fertilizer component is prepared by hammermilling together a 50:50 mixture by weight of ammonium sulfate and pyrophyllite to obtain a fine uniform composition; and (3) the inhibitor component and fertilizer component are mixed together on a roller mill to obtain a soil treating composition containing N,N-dimethylthio-pyrazole-1-carboxamide in concentrations of 2, 1 and 0.5 percent based on the nitrogen in the composition.

What is claimed is:

1. A method comprising distributing in a plant growth medium a nitrification-inhibiting amount of a substituted pyrazole compound corresponding to the formula

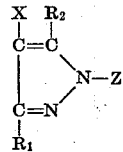

wherein $R_1$ and $R_2$ each independently represent methyl or hydrogen, X represents hydrogen, chlorine or bromine and Z represents loweralkylcarbonyl, loweralkyl thiolcarbonyl, N,N-di(loweralkyl)-carbamoyl or N,N-di(loweralkyl)-thiocarbamoyl, in which loweralkyl is of from 1 to 4 carbon atoms, inclusive, with the proviso that when Z is di(loweralkyl)-thiocarbamoyl or di(loweralkyl)-carbamoyl, both $R_1$ and $R_2$ are hydrogen.

2. The method of claim 1 wherein the compound is methyl pyrazole-1-thiolcarboxylate.

3. The method of claim 1 wherein the compound is methyl pyrazole-1-carboxylate.

4. The method of claim 1 wherein the compound is ethyl pyrazole-1-carboxylate.

5. The method of claim 1 wherein the compound is ethyl 3,5-dimethylpyrazole-1-carboxylate.

6. A method comprising distributing in a plant growth medium a nitrification-inhibiting amount of a substituted pyrazole compound corresponding to the formula

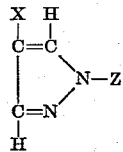

wherein X represents hydrogen, chlorine or bromine and Z represents N,N-di(loweralkyl)-carbamoyl or N,N-di-(loweralkyl)-thiocarbamoyl, in which loweralkyl is of from 1 to 4 carbon atoms, inclusive.

7. The method of claim 6 wherein the compound is N,N-dimethyl-pyrazole-1-carboxamide.

8. The method of claim 6 wherein the compound is N,N-dimethylthio-pyrazole-1-carboxamide.

9. The method of claim 6 wherein the compound is N,N-dimethyl-4-chloropyrazole-1-carboxamide.

10. A composition comprising a reduced nitrogen fertilizer in admixture with a nitrification-inhibiting amount of a substituted pyrazole corresponding to the formula

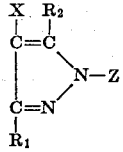

wherein $R_1$ and $R_2$ each independently represent methyl or hydrogen, X represents hydrogen, chlorine or bromine and Z represents loweralkylcarbonyl, loweralkyl thiolcarbonyl, N,N-di(loweralkyl)-carbamoyl or N,N-di(loweralkyl)-thiocarbamoyl in which loweralkyl is of from 1 to 4 carbon atoms, inclusive, with the proviso that when Z is di(loweralkyl)-thiocarbamoyl or di(loweralkyl)-carbamoyl, both $R_1$ and $R_2$ are hydrogen.

11. A composition comprising a reduced nitrogen fertilizer in admixture with a nitrification-inhibiting amount of a substituted pyrazole corresponding to the formula

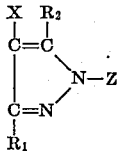

wherein $R_1$ and $R_2$ each independently represent methyl or hydrogen, X represents hydrogen, chlorine or bromine and Z represents loweralkylcarbonyl, loweralkyl thiolcarbonyl, N,N-di(loweralkyl)-carbamoyl or N,N-di(loweralkyl)-thiocarbamoyl in which loweralkyl is of from 1 to 4 carbon atoms, inclusive, with the proviso that when Z is di(loweralkyl)-thiocarbamoyl or di(loweralkyl)-carbamoyl, both $R_1$ and $R_2$ are hydrogen, and wherein the reduced nitrogen fertilizer is an inorganic ammonium salt.

12. A composition comprising a reduced nitrogen fertilizer in admixture with a nitrification-inhibiting amount of a substituted pyrazole corresponding to the formula

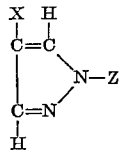

wherein X represents hydrogen, chlorine or bromine and Z represents N,N-di(loweralkyl)-carbamoyl or N,N-di(loweralkyl)-thiocarbamoyl in which loweralkyl is of from 1 to 4 carbon atoms, inclusive.

13. The composition of claim 12 wherein the compound is N,N-dimethyl-pyrazole-1-carboxamide.

References Cited

UNITED STATES PATENTS

| | | |
|---|---|---|
| 3,150,148 | 9/1964 | Dulin et al. |
| 3,169,091 | 2/1965 | Gordon. |
| 3,282,978 | 11/1966 | Swakon. |
| 3,284,188 | 11/1966 | Amagasa et al. _____ 71—28 X |
| 3,308,130 | 3/1967 | Bousquet. |

OTHER REFERENCES

Hückel et al., Berichte, vol. 70, p. 2025 (1937).
Twomey, J. Org. Chem. 30: pp. 2494–7 (August 1966).

S. LEON BASHORE, Primary Examiner
R. D. BAJEFSKY, Assistant Examiner

U.S. Cl. X.R.

71—54